United States Patent
Braun et al.

(10) Patent No.: US 7,002,924 B2
(45) Date of Patent: Feb. 21, 2006

(54) ZERO CONFIGURATION NETWORKING

(75) Inventors: David Braun, Denville, NJ (US); Sarit Mukherjee, Morganville, NJ (US); Cuneyt Akinlar, Garden Way, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 932 days.

(21) Appl. No.: 09/776,586

(22) Filed: Feb. 2, 2001

(65) Prior Publication Data

US 2002/0003780 A1 Jan. 10, 2002

Related U.S. Application Data

(60) Provisional application No. 60/180,176, filed on Feb. 4, 2000.

(51) Int. Cl.
*H04L 12/28* (2006.01)

(52) U.S. Cl. ..................... 370/254; 370/401

(58) Field of Classification Search .............. 370/351, 370/254, 252, 352, 401, 465, 474, 428, 466, 370/467, 389, 395.1; 709/220, 223, 226, 709/249; 707/7, 10, 1

See application file for complete search history.

(56) References Cited

U.S. PATENT DOCUMENTS 6,868,441 B1 * 3/2005 Greene et al. ............. 709/220

FOREIGN PATENT DOCUMENTS

JP          04154330 A    5/1990
JP        2000022757 A    1/2000

* cited by examiner

*Primary Examiner*—Dang Ton
(74) *Attorney, Agent, or Firm*—Harness, Dickey & Pierce, PLC

(57) ABSTRACT

The Routing Information Protocol [RIP] is extended to include a network-wide unique interface identifier [UID] that allows the zeroconfiguration multiple router [R1, R2] network to detect subnet conflicts. Detected conflicts are automatically repaired by the respective routers assigning and advertising new subnet mappings. The extended, Zero-configuration Routing Information Protocol [ZRIP] employs a NORMAL/CHANGE status flag associated with each routing table entry to resolve ambiguity between normal routing advertisements and conflict notifications. Address re-mapping and name-to-address resolution is provided to support both network address translation [NAT] and virtualized address paradigms.

29 Claims, 5 Drawing Sheets

```
 0                   1                   2                   3
 0 1 2 3 4 5 6 7 8 9 0 1 2 3 4 5 6 7 8 9 0 1 2 3 4 5 6 7 8 9 0 1
    command (1)    version (1)         must be zero (2)
```

RIP Entry (20)

RIP Entry (20)

```
 0                   1                   2                   3
 0 1 2 3 4 5 6 7 8 9 0 1 2 3 4 5 6 7 8 9 0 1 2 3 4 5 6 7 8 9 0 1
      Address Family Identifier (2)        Route Tag (2)
```

IP Address (4)
Subnet Mask (4)
Next Hop (4)
Metric (4)

```
0                   1                   2                   3
0 1 2 3 4 5 6 7 8 9 0 1 2 3 4 5 6 7 8 9 0 1 2 3 4 5 6 7 8 9 0 1
command (1)    version (1)         must be zero (2)
```

ARIP Entry (32)

ARIP Entry (32)

```
0                   1                   2                   3
0 1 2 3 4 5 6 7 8 9 0 1 2 3 4 5 6 7 8 9 0 1 2 3 4 5 6 7 8 9 0 1
```
| Address Family Identifier (2) | Route Tag (2) |
| Interface Type (1) | |
| Unique Interface Identifier (11) | |
| IP Address (4) | |
| Subnet Mask (4) | |
| Next Hop (4) | |
| Metric (4) | |

ZERO CONFIGURATION NETWORKING this application claims the benefit of provisional application No. 60/180,176 filed Feb. 4, 2000.

BACKGROUND AND SUMMARY OF THE INVENTION

The present invention relates generally to information networks and more particularly to an improved configuration system that will allow hosts and routers to configure themselves automatically.

With the proliferation of network attached appliances and inexpensive computing devices there is an increasing demand for internetworking among these devices. It is anticipated that such devices will be interconnected to form ad-hoc, dynamic networks, with frequent disconnections and reconnections of devices to and from the network, and frequent changes in the network topology. Ideally, networking in such an environment should be done without any user intervention or administration. The term "zero-configuration networking" is sometimes used to describe this new paradigm of networking.

Zero-configuration networking has proven challenging to implement, particularly where the network consists of multiple routers connecting various segments. Generally speaking, a zero-configuration network should satisfy the following properties:

absence of administration: the system should enable networking in the absence of configuration and administration. In this regard, so called Dynamic Host Configuration Protocols (DHCP) and Domain Name Servers (DNS) and Multi-Cast Address Dynamic Client Allocation Protocol (MADCAP) fall short in that each of these requires an administrator to set up or configure the server before it can be used.

Co-existence and transition: a zero-configuration protocol in one area may need to co-exist with a non-zero configuration protocol from another area. For example, a host might be using a non-zero configuration protocol for IP host configuration (such as DHCP) but a zero-configuration protocol for name-to-address translation. Preferably, the zero configuration protocol should revert to an administered protocol if such an administered protocol exists. This also means that a zero configuration protocol and a non-zero configuration protocol for the same area cannot co-exist within a zero configuration network. For example, assume that a host is using a zero configuration protocol for IP host configuration. If an administrator installs a DHCP server into the network, the host must reconfigure to use the DHCP server. The reverse transition from an administered mode to a zero configuration mode must also exist.

Interoperability: Zero configuration protocols should be based on the existing administered protocols as much as possible for maximum interoperability.

The above properties have implications in one or more of the following areas of networking:

1. IP Host Configuration: A host automatically gets its IP address, netmask, default router address, DNS server address. In this regard, DHCP is the administered IP host configuration protocol.
2. Name-To-Address Translation: A host can translate between name and address of other hosts without any user intervention. Note, DNS is the administered name-to-address translation protocol.
3. Automatic Allocation Of Multicast Addresses: Hosts can agree on a multicast address without any user administration.
4. Service Discovery: A host is able to discover all the services (e.g., printing, faxing, storage) available within the network.

To appreciate why zero configuration networking is challenging in a multirouter network, consider FIGS. 1a and 1b. Assume that router R1 and router R2 are stand-alone routers which are initially disconnected and subsequently connected as at X. Prior to connection at X, the respective routers perform initialization which assigns subnet numbers to their respective interfaces. Thus, router R1 assigns subnet numbers x.0, y.0 and z.0 to its interfaces 1, 2 and 3, respectively. Similarly, router R2 assigns subnet numbers v.0, x.0 and w.0 to its interfaces 1, 2 and 3, respectively. FIG. 1a shows the respective routing tables of routers R1 and R2. Note that each routing table identifies the destination associated with each interface, the gateway associated with each destination, as well as a metric that prescribes the number of hops required to reach the destination. Note that in the initial case (FIG. 1a) all destinations associated with each router can be reached in one hop.

Now, assume that the networks are connected as at X, as shown in FIG. 1b. That is, interface 3 of router R1 is now connected to interface 1 of router R2. According to standard RIP, version 2, protocol, the routers will exchange RIP packets in the prescribed process by which the routers learn the new routes. FIG. 1b shows the routing table entry (RTE) records contained in the RIP packets sent between routers R1 and R2. Note that each router sends an RIP packet to the other router, in effect, exchanging information about the new routes. When the routers receive the RIP packets from each other, they calculate new routing tables that are augmented with the new routes just learned. FIG. 1b shows the new routing tables associated with each router. Notice that there is no way for router R2 to detect that router R1 is using subnet x.0 on its interface one for this reason. When the RIP packet from router R1 is received, router R2 assumes that the subnet x.0 specified in the RIP packet refers to the same subnet that router R2 has assigned on interface two. Because subnet x.0 is directly connected to router R2, the subnet x.0 specified within the RIP packet is discarded under standard RIP handling protocol because it has a higher cost (larger number of hops). When router R1 receives the RIP packet from router R2 it conducts a similar calculation and does not change its subnet assignment on interface one.

At this point, there are two segments in the network that use the same subnet number, namely, x.0. The hosts at network x.0 of router R1 are not visible from any host connected to router R2, and vice versa. In order for correct operation of the network, this subnet conflict in the new network must be resolved. For consistency, both routers may change their subnet assignment x.0 to new unique subnet numbers to thus bring the network to a consistent state. However, as the above example shows, standard RIP protocol cannot detect and resolve subnet conflicts.

The present invention addresses the foregoing issue by providing an improved protocol, termed zeroconfiguration routing information protocol (ZRIP), which solves the above-illustrated problems while retaining compatibility with standard RIP protocol. The improved ZRIP protocol includes a mechanism for detecting subnet conflicts as well as mechanisms for subsequent conflict notification and resolution. Using the improved protocol, a system of routers can be autoconfigured while supporting address remapping and name-to-address resolution across the network.

For a more complete understanding of the invention and its objects and advantages, refer to the following written description and the accompanying drawings.

BRIEF DESCRIPTION OF THE DRAWINGS

FIGS. 1a and 1b being useful in understanding some of the problems that the present invention solves;

DESCRIPTION OF THE PREFERRED EMBODIMENTS

Figure 1A:
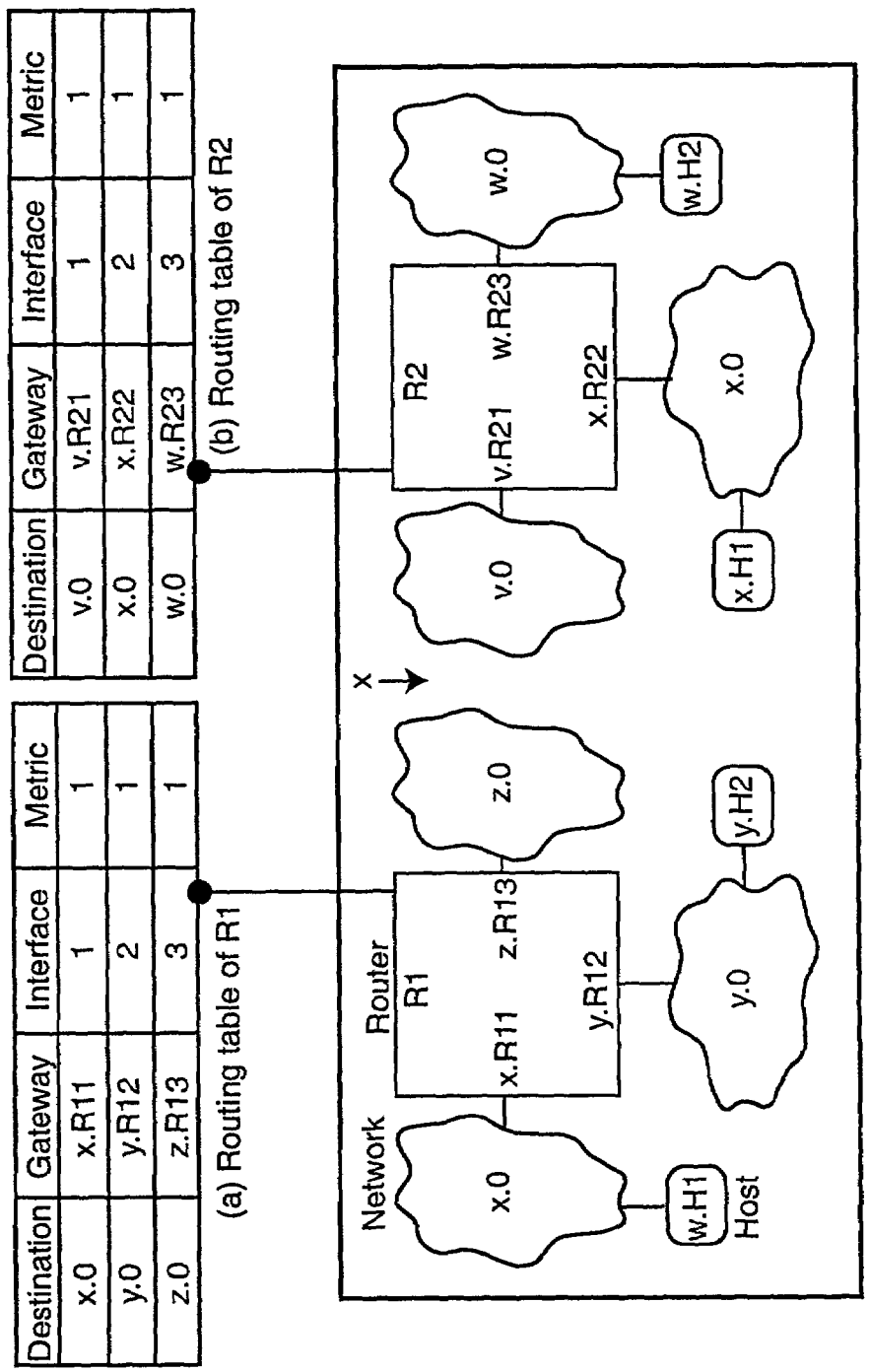
FIG. 1a is a multirouter network interconnection diagram illustrating how router tables would be configured in a prior art system.
Figure 1B:
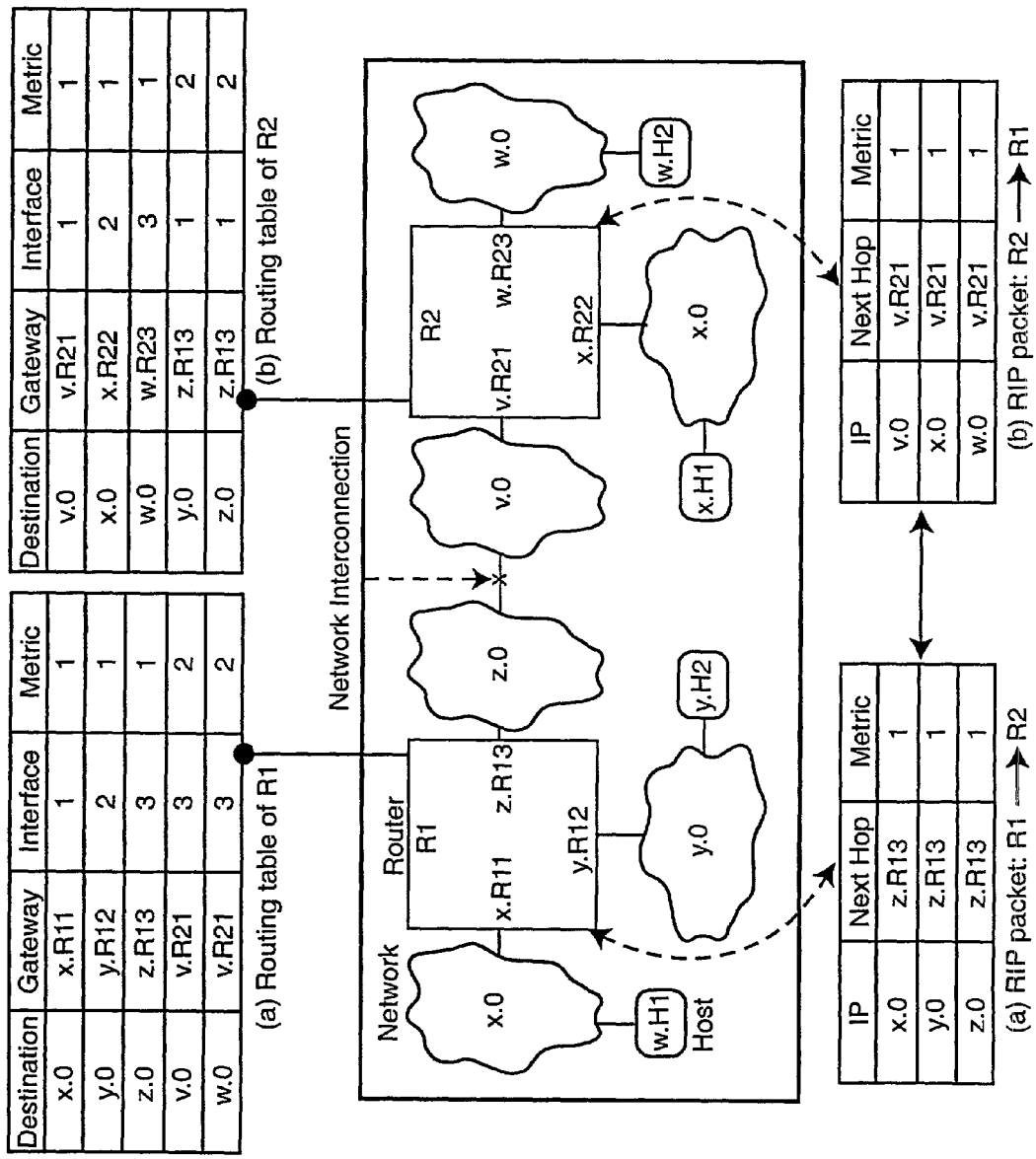
FIG. 1b is a multirouter interconnection diagram illustrating how the routing tables would be updated in a prior art system.

In a conventional administered network, routing protocols, such as the popular Routing Information Protocol (RIP) is used to exchange routing information between routers in the network. Subnet conflict detection and resolution is usually not an issue in administered networks, as there will be no subnet conflicts in a network that is correctly set up by an administrator. However, the conventional routing protocol does not adequately address subnet conflict detection and resolution issues when a zeroconfiguration environment is involved. FIGS. 1a and 1b, discussed above, illustrate the nature of the problem.

The present invention provides several important extensions to the RIP protocol, extending that protocol to cover zeroconfiguration environments. We refer to the improved protocol as the zeroconfiguration routing information protocol or ZRIP. The ZRIP protocol extends the RIP packet structure, specifically the routing table entry (RTE) structure. Each RTE in an RIP packet specifies a subnet number, a netmask, the next hop router to reach the subnet and the hop count to reach the subnet.

Subnet Conflict Detection

In order to detect subnet conflicts after the routers are interconnected, the present invention uses a unique interface identifier (UID) with each RTE. A UID uniquely identifies a segment connected to an interface of a router within the zero configuration network. In this context, a segment refers to both links and extended links between nodes. A link is a communication pathway (an Ethernet link, for example). An extended link corresponds to two links joined by a bridge, for example. When a router initializes it generates a UID for an interface and then algorithmically or randomly assigns a locally unique subnet number. Thus each interface is associated with a network-wide unique UID.

While there are a variety of ways to generate unique UIDs, the presently preferred embodiment employs a UID of nine bytes in length. The first byte corresponds to the hardware type of the interface. The remaining eight bytes can be generated from the MAC address of the interface or randomly generated in case the interface does not have a MAC address. For example, if the interface is Ethernet, the first byte of the UID is the hardware number for Ethernet and the last eight bytes of the UID are the six byte Ethernet MAC address, concatenated with two bytes of zeros. Since Ethernet MAC addresses are globally unique, this will generate a unique UID for the interface, and for the segment connected to that interface as well as the subnet assigned to that interface. The UID can be generated similarly for other types of interfaces.

Referring to FIG. 1a, the routing tables for routers R1 and R2 are modified as illustrated in Table I below, to include the UID information in accordance with the invention. Thereafter, when the routers are connected together, as illustrated in FIG. 1b, each router advertises routes to the other through their respective RTE packets. These RTE packets are also modified in accordance with the invention to include the UID information associated with the subnet, as illustrated in Table II below. When the routers receive the packets from each other, they calculate new routing tables that are augmented with the new routes just learned. The new routing tables would thus be generated (including the UID values) as shown in Table III below. Because each route is now uniquely identified by its UID, the routers can easily detect subnet collisions. In Table III the subnet conflicts are marked with asterisks.

| UID | Dest. | GW | Interface | Metric |
|---|---|---|---|---|
| (a) Routing table of RI with UID | | | | |
| UID11 | x.0 | x.R11 | 1 | 1 |
| UID12 | y.0 | y.R12 | 2 | 1 |
| UID13 | z.0 | z.R13 | 3 | 1 |
| (b) Routing table of R2 with UID | | | | |
| UID21 | v.0 | v.R21 | 1 | 1 |
| UID22 | x.0 | x.R22 | 2 | 1 |
| UID23 | w.0 | w.R23 | 3 | 1 |

TABLE I

Routing tables when the routers are stand-alone, augmented with UIDs.

| UID | IP | Next Hop | Metric |
|---|---|---|---|
| (a) Routing packet: R1 → R2 | | | |
| UID11 | x.0 | z.R13 | 1 |
| UID12 | y.0 | y.R13 | 1 |
| UID13 | z.0 | z.R13 | 1 |
| (b) Routing packet: R2 → R1 | | | |
| UID21 | v.0 | v.R21 | 1 |
| UID22 | x.0 | x.R22 | 1 |
| UID23 | w.0 | w.R23 | 1 |

TABLE II

Routing packet exchange between routers, with UIDSs.

| UID | Dest. | GW | Interface | Metric |
|---|---|---|---|---|
| (a) Routing table of R1 with UID | | | | |
| UID21 | v.0 | v.R21 | 1 | 1 |
| UID22 | *x.0 | x.R22 | 2 | 1 |
| UID23 | w.0 | w.R23 | 3 | 1 |
| UID11 | *x.0 | z.R13 | 1 | 2 |
| UID12 | y.0 | z.R13 | 1 | 2 |
| UID13 | z.0 | z.R13 | 1 | 2 |
| (b) Routing table of R2 with UID | | | | |
| UID11 | *x.0 | x.R11 | 1 | 1 |
| UID12 | y.0 | y.R12 | 2 | 1 |
| UID13 | z.0 | z.R13 | 3 | 1 |
| UID21 | v.0 | v.R21 | 3 | 2 |
| UID22 | *x.0 | v.R21 | 3 | 2 |
| UID23 | w.0 | v.R21 | 3 | 2 |

Table III: Routing tables after the routers are connected, augmented with UIDs.

Router R2 knows that it has assigned subnet x.0 to its interface two, identified by UID 22. Router 2 detects that router R1 has assigned subnet x.0 to router R1's interface identified by UID 11. Similarly, Router R1 detects that its x.0 subnet conflicts with one of the router R2's subnets. Note that the presence of the respective UID's prevents the standard RIP handling protocol from ignoring the higher hop routings sharing the conflicting subnet assignment.

Subnet Conflict Notification

After an address conflict has been detected by a router, it assigns a new subnet number to the conflicting interface. The new subnet must be an address that is different from one already used, so that it will be unique within the zeroconfiguration network. Thus, in the previous example, once router R2 detects the conflict on subnet x.0, it will assign a new subnet number to its interface two. The new subnet number must be an address different from x.0, y.0, z.0, v.0 and w.0, so that it is unique within the network.

Assume that the new subnet mapping is assigned UID 22 and corresponds to an IP address of t.o. Router R2 needs to notify router R1 of the conflict on UID 11 (designated as conflicting by the asterisk in Table III). This notification allows router R1 to also change its subnet mapping (UID 11, x.0). In order to solve the problem of conflict notification, the present invention employs a status flag that is associated with each RTE within a ZRIP packet. The presently preferred embodiment implements two states designated by the status flag: a NORMAL state (corresponding to a valid RTE without any conflict) and a CHANGE state (corresponding to an indication that there was a conflict somewhere in the network for this RTE). The status flag is added as a field in the ZRIP packet as illustrated in Table IV. This flag is used to track when conflicts have occurred so that the respective routers can properly notify one another. According to the presently preferred protocol, the network address in the RTE is changed by the router owning the interface. The owning router of an RTE is the router that owns the corresponding network interface. In the presently preferred ZRIP protocol, it is always the owning router that assigns an address to the interface/segment.

TABLE IV

ZRIP packet from R2 and R1 after R2 detects subnet address conflict and sends notification to R1, augmented with status information.

| UID | IP Addr. | Next Hop | Metric | Status |
|---|---|---|---|---|
| UID21 | t.0 | v.R21 | 1 | Normal |
| UID22 | v.0 | v.R21 | 1 | Normal |
| UID23 | w.0 | v.R21 | 1 | Normal |
| UID11 | x.0 | v.R21 | 2 | Change |
| UID12 | y.0 | v.R21 | 2 | Normal |
| UID13 | z.0 | v.R21 | 2 | Normal |

When router R2 detects the address collision on UID 11 in the above example, it marks the corresponding RTE entry with the CHANGE flag. See Table IV above. When router R2 sends out ZRIP packet, all the RTEs are included within the packet with their status byte marked appropriately. The RTEs marked with the NORMAL flag are intended to be route advertisements. Those marked with the CHANGE flag are intended to be conflict notifications. Thus the status flag serves as a mechanism for allowing the existing infrastructure to communicate both conventional routing advertisements and also conflict notifications. In the preceding example, the ZRIP packet from router R2 to router R1 is shown in Table IV. As that table shows, the route identified by UID 11 is marked as "CHANGE." When router R1 gets this packet, it learns that somewhere in the network there was a subnet conflict with its subnet assignment (UID 11 x.0). Router R1 then changes the conflicting subnet.

Note also that the ZRIP packet from router R2 to router R1 also includes RTEs (UID 12, y.0) and (UID 13, z.0). Router R2 need not send these two RTEs back to router R1 because it learned them from router R1. This same technique can be used under the ZRIP protocol for all normal RTEs as well. However, the RTE subnet flag with the change status (UID 11, x.0) must be sent back to router R1, because this RTE is a subnet conflict notification, not a route advertisement. According to the presently preferred embodiment, any time the status of an RTE changes to the CHANGE status, it must be reported to the originator (i.e. the router from which the route from learned). As a result of the above conflict resolution message exchange, the shared segment between routers R1 and R2 may be assigned to different subnet numbers (z.0 and v.0 in the preceding example).

Conflict Resolution Tracking

As the topology of a zero configuration network becomes more complex, it is possible that a router may get conflicting values for the same RTE (as identified by the UID) from different routers. Consider the zeroconfiguration network of FIG. 2. Initially, routers R1, R2, R3, R4 and R5 are connected and the network is stable. Router R5 knows that router R4 has a mapping (UID 4, y.0). Notice from FIG. 2 that router R1 sends packets to router R5 in order to reach y.0, because y.0 is three hops away through router R5, but four hops away through router R2. Now assume that router R6 is connected to router R4, and router R6 has the mapping (UID 6, y.0). After router R4 gets a ZRIP packet from router R6, it detects the subnet conflict and changes the subnet mapping (UID 4, y.0) to (UID 4, z.0). Router R4 then sends a ZRIP packet to both routers R3 and R5, notifying them of the changes.

Assume that the ZRIP packet to router R5 is lost. Router R3 gets the ZRIP packet, updates its routing table and forwards it. Router R5 still has the old UID to subnet mappings. When router R1 gets a ZRIP packet from router R2 with the new mapping (UID 4, z.0) it has to make a decision whether it is going to accept this new route or not. Note that the new subnet assignment is still four hops away through router R2, but has a different subnet assignment. Without additional information, router R1 cannot make a decision. If router R1 accepts the new subnet assignment (UID 4, z.0) and starts sending the packet to router R2 to reach the subnet z.0, when router R5 sends its periodic ZRIP packet to router R1 it will contain the old mapping (UID 4, y.0) with a smaller hop count. Router R1 has no way of identifying whether (UID 4, y.0) is the old copy, or another new subnet assignment.

address the foregoing issue the preferred embodiment employs a sequence numbering mechanism. The preferred embodiment implements a two byte sequence number that is assigned and changed by the owning router of the RTE. According the ZRIP protocol, each router must maintain a sequence number for each of its subnet assignments. This sequence number is implemented when a router changes the subnet mapping due to a subnet conflict. The sequence number is not implemented when a route is advertised by the router.

By augmenting each RTE with a sequence number assigned and maintained by the owning router, the above described ambiguity is solved. In the example, initially (UID 4, y.0) has a sequence number of 1. When router R4 changes the subnet assignment to (UID 4, z.0) it increases the sequence number to 2 and then notifies its neighbors. When router R1 gets the ZRIP packet from router R2 containing the new mapping (UID 4, z.0), it can easily determine that (UID 4, y.0) is the old mapping, as its sequence number is 1. Thus, router R1 deletes the old subnet mapping and starts using the new mapping which has a sequence number of 2. Any stale copy that arrives from router R5 to router R1 will have a sequence number of 1 for this RTE. Accordingly, router R1 will not use it. When router R5 eventually learns about the new mapping and notifies router R1 with a smaller hop count for the subnet, router R1 will send the packets for (UID 4, z.0) to router R5 instead of router R2.

Address Remapping

To achieve stable state requirements in multirouter zero-configuration network, the system should preserve existing connections in the face of topological changes in the network. Thus, hosts should not change their IP addresses after addition or removal of routers to and from a segment, and routers should maintain their current subnet mappings even after the addition or removal or routers. This is a challenging requirement which FIG. 2 will help illustrate.

Figure 2:
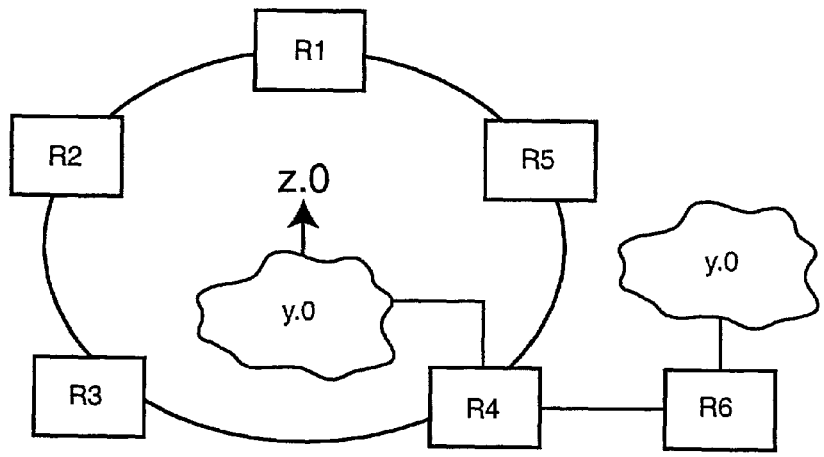
FIG. 2 is a multirouter network diagram illustrating how the subnet address conflict is detected and corrected using the invention.
Figure 3:
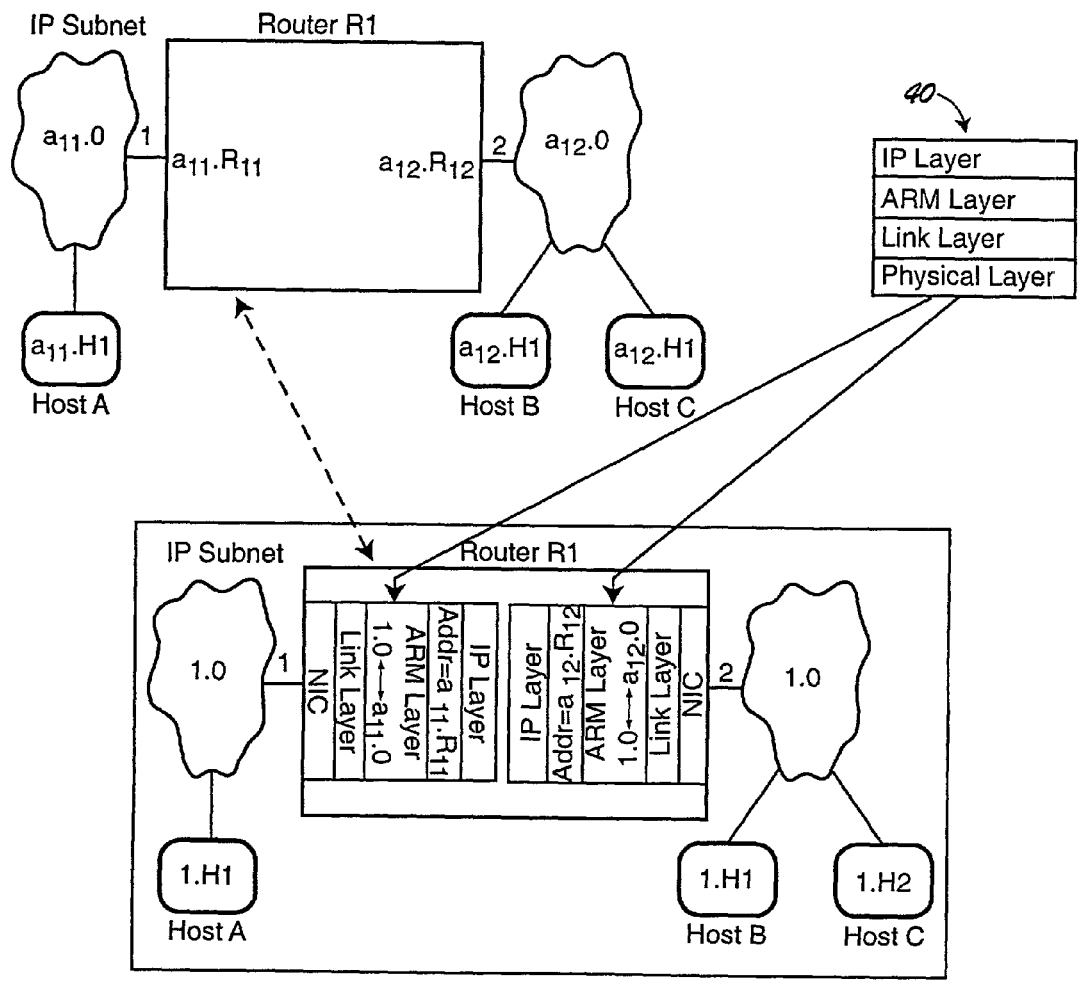
FIG. 3 illustrates an address remapping (ARM) router useful in performing transparent IP address remapping between hosts on different segments for intersegment communication in accordance with the invention.

Referring to FIG. 2, there are two IP segments, one containing a single host A and the other containing two hosts B and C. Before the router connects these two segments, the hosts have link-local addresses IA, IB and IC. Assume that there was a connection between hosts B and C before router R1 is installed. In FIG. 3, router R1 assigns subnets a11.0 and a12.0 to its interfaces (directly connected segments) during initialization. After router R1 connects the segments, hosts B and C reconfigure their IP addresses to a12.B and a12.C, respectively. This tears down the existing connection between these two hosts. Similarly, when router R1 is removed, the hosts will switch back to link-local addresses and existing local connections break again. The problem is magnified in multirouter networks: if the addition of a router causes subnet conflicts, the routers involved in the conflict reconfigure their conflicting subnet mappings, which breaks connections involving hosts in the reconfigured part of the network.

The present invention is capable of addressing the foregoing issue even in the absence of a DHCP server. Hosts on the routerless segment configure link-local addresses in the absence of a DHCP server and the hosts then maintain their link-local addresses throughout their lifetime. Because a host with a link-local address cannot communicate with hosts on different IP segments, the preferred embodiment employs an address remapping (ARM) router. This ARM router performs transparent IP address remapping between hosts on different segments for inter-segment communication. Advantageously, the hosts are not made aware of this translation and will continue using their link-local IP addresses.

According to the presently preferred embodiment, in the ARM scheme, a router assigns unique subnet numbers on the private address range 10.x/16 to each of its interfaces during initialization. We refer here to such unique private subnet numbers as "locally defined" subnet numbers (LD-subnetid) for the segment. The hosts on each segment are still part of the link-local (I) subnet which we refer to here as the "externally defined" subnet number (ED-subnetid) for the segment. Both terms "locally defined" and "externally defined" are from the point of view of the router.

The ARM router keeps the LD-subnetid to ED-subnetid mapping for each segment and converts link-local (externally defined) addresses of the hosts to locally defined private addresses, and vice versa, for inter-segment communication. To achieve this translation, an ARM layer is defined and placed between the linked layer and IP layer, as illustrated in FIG. 3. The ARM layer is thus inserted in the IP protocol stack as shown in FIG. 3 at 40.

The ARM routers IP layer works with the locally defined subnet numbers and is unaware of the translation performed by the ARM layer. In FIG. 3 the ARM router is illustrated as connecting two segments. The hosts on these segments use link-local addresses. From the perspective of the routers IP layer, however, the router assigns LD-subnetids a11.0 and a12.0 to its interfaces 1 and 2, respectively. The routers interfaces are also assigned unique IP addresses, a11.R11 and a12.R12. The ARM layer maintains the local-to-external mappings. For example, in FIG. 3, on interface 1, the mapping is between LD-subnetid a11.0 and ED-subnetid I.0.

Name-To-Address Resolution

The invention performs name-to-address resolution by having each host identify hosts on its segment, with link-local addresses, while the remainder of the network uses the LD-subnetids of its default router. The concept is illustrated in FIG. 3. From router R1's perspective, the network consists of two segments with LD-subnetids a11.0 and a12.0. From host B's perspective, host C's IP address is IH2 since they are on the same segment, but host A's IP address is a11.H1. Notice that hosts A and B are on different segments and host A sits on the subnet a11.0 from the perspective of router R1, the default router of host B. Similarly, from host A's perspective, host B's IP address is a12. H1 and host C's address is a12.H2.

Consider the zeroconf network of FIG. 3. As the FIGURE depicts, the ARM router R1 assigns LD-subnetids $a_{11}$ and $a_{12}$ to its interfaces. So, from the viewpoint of the IP layer of R1, the whole network consists of 2 segments with subnet numbers $a_{11}$.0 and $a_{12}$.0. Externally however, the hosts sit on the link-local subnet. The ARM layer is responsible for the mapping between the LD-subnetids used by the IP layer and the ED-subnetids. R1 maintains the following ARM table:

| Interface | ED-Subnetid | LD-Subnetid |
|---|---|---|
| 1 | I | $a_{11}$ |
| 2 | I | $a_{12}$ |

The router ARM layer performs External-to-Local Address Remapping on incoming packets, remapping the source IP address of a packet to its equivalent local IP address. Then the IP layer gets the packet, routes it based on the packet's destination IP address which is valid only locally within the router, and gives the packet to the ARM layer for transmission. The ARM layer performs Local-to-External Address Remapping, on the destination IP address of the packet and then gives it to the link-layer for transmission.

To see how the mappings work in the network of FIG. 3, assume that host A (I.H1) sends a packet to host B (IH1). We described above, from host A's perspective host B's address is $a_{12}$.H1. The packet from A to B will go through the IP address remappings shown in Table V below. In the reverse direction, the packet goes through similar translations as shown in Table VI below

TABLE V

The translations of the source and destination IP of a packet going from host A to host B.

| SourceIP | DestIP | Comment |
|---|---|---|
| I.H1 | $a_{12}$.H1 | Packet (pkt) leaves host A |
| $a_{11}$.H1 | $a_{12}$.H1 | Pkt rcvd by R1 and given to IP layer |
| $a_{11}$.H1 | I.H1 | Right before the pkt sent by R1 on intf 2 |
| $a_{11}$.H1 | I.H1 | Pkt rcvd by B and given to the application |

TABLE VI

The translations of the source and destination IP of a packet going from host B to host A.

| SourceIP | DestIP | Comment |
|---|---|---|
| I.H1 | $a_{11}$.H1 | Packet (pkt) leaves host B |
| $a_{12}$.H1 | $a_{11}$.H1 | Pkt rcvd by R1 and given to IP layer |
| $a_{12}$.H1 | I.H1 | Right before the pkt sent by R1 on intf 1 |
| $a_{12}$.H1 | I.H1 | Pkt rcvd by A and given to the application |

Table VII below shows the algorithms used by an ARM router to process a packet. When a packet is received, ED2LD performs external to local address remapping on the source IP address of the packet by a simple ARM table lookup. Once the source IP of the packet is mapped to the local representation, the IP checksum is recalculated. If necessary, the transport layer (UDPTCP) checksum is also recalculated and the packet is given to the network (IP) layer. After the packet reaches the IP layer, IP routing is performed based on its destination address which already has a local representation,

TABLE VII

Algorithms for packet processing by an ARM router

```
/* Router R receives a packet with Source IP (SIP)
    and Destination IP (DIP) at Interface If*/.
ED2LD (Packet [SIP,DIP])
    Int-SIP = ARM-Table[If][SIP]
    SIP = Int-SIP
```

TABLE VII-continued

Algorithms for packet processing by an ARM router

```
    Recalculate the IP checksum
    Recalculate (TCP/UDP) checksum if necessary
    Return the new Packet [Int-SIP,DIP] to IP layer.
/* Router R is sending a packet with Source IP (SIP)
    and Destination IP (DIP) at Interface If*/.
LD2ED (Packet [SIP,DIP])
    Ext-DIP = ARM-Table[DIP]
    DIP = Ext-DIP
    Recalculate the IP checksum
    Recalculate (TCP/UDP) checksum if necessary
    Return the new Packet [SIP,Ext-DIP] to ARM layer.
``` and the packet is forwarded to the ARM layer for transmission. Notice that after the IP routing is performed, the interface from where the packet will be sent is already determined. The ARM layer then calls LD2Ed to convert the destination IP address to external representation by a simple ARM table lookup. As before, the IP checksum is recalculated. The transport layer checksum is recalculated if necessary. After the new packet is formed, it is given to the link-layer for transmission. Notice that the IP layer is not aware of the ARM layer and always works on the locally-defined subnet numbers.

Changes to the Host Configuration Protocol

To preserve existing connections, the hosts must continue using their already configured link-local addresses after an ARM router is connected to the segment but need to configure the ARM router as their default router. If the hosts are using the standard IP host configuration protocol, they will hold on to their link-local addresses until a DHCP-Server becomes available. So, if the router does not run a mini-DHCP-Server, this is automatically accomplished. The host default router setup can be accomplished with ICMP router advertisements: An ARM router periodically advertises its IP address, and the hosts configure their default router based on the advertisement.

It is also possible to run a mini-DHCP at an ARM router to set up host addresses. However, a mini-DHCP running at an ARM router must distribute link-local addresses. A host needs to include its current link-local address in the DHCP-DISCOVER message and the mini-DHCP needs to record the address and grant it to the host so that the host can continue using the same link-local address. Necessary DHCP options are available for this scheme to work. In short, by a simple change to the standard host configuration protocol the hosts can continue using their link-local addresses and configure a default router when an ARM router is connected.

Extending ARM Scheme to Multi-Router Network

The goal of the ARM scheme is to preserve the existing connections between hosts even in the face of topological changes to the network like new router additions, new link additions/removals. The existing connections can only be preserved if the hosts are allowed to continue using the current IP addresses and are not forced to reconfigure. ARM does this by allowing each router to develop a local model of the network where each subnet (segment) has a locally unique number. This model is then transparently mapped onto the physical topology by the address mapping mechanism.

As the router learns about the existence of new segments in the network through a dynamic routing protocol, it assigns a locally-unique subnet number to each segment which is identified by a globally unique segment identifier. This locally-defined subnetid does not have to be unique within the entire network. It is sufficient that the subnetid be unique within each router in the network which means that the subnet conflicts cannot occur. In essence, each router has its own viewpoint of the entire network and keeps a unique locally-defined to externally-defined subnetid mapping for each segment of the network.

In this scheme, the source and destination IP address of a packet is valid only from the viewpoint of the current router forwarding the packet. When the packet is forwarded to another router, the source and destination addresses are translated to their respective mappings from the viewpoint of the next hop router. Thus, as the packet traverses the network, each router performs an address translation based on its own ARM table.

Dynamic Routing Information Exchange

In administered networks, routers use dynamic routing protocols such as Routing Information Protocol (RIP) and Open Shortest Path First (OSPF) to exchange routing information. This way, the routers in the network learn about all the subnets in the network. It is important that an ARM router learns the existence of new segments (routes) in the network because the router must define locally-define unique subnetid for the new segments before any packet can be sent to hosts on the new segments. So, an ARM router must be able to detect the new segments with the information provided by the routing protocol. Below we examine what happens when we use the RIP in a zeroconf network consisting of ARM routers for dynamic routing information exchange.

A RTPv2 packet consists of a header and several Routing Table Entry (RTE) records. The RIP packet format and the format of the 20 octet RTE for RIPv2 are shown in FIG. 4.

Figures 4, 5:
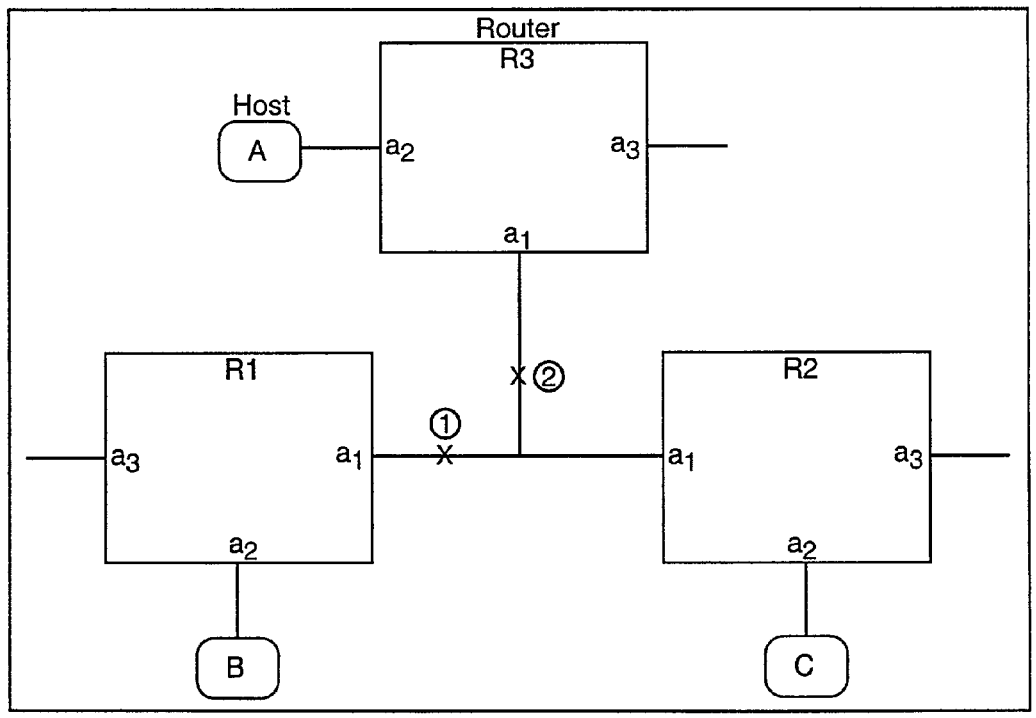
FIG. 4 illustrates a presently preferred format of the ZRIP packet and its associated routing table entry.
FIG. 5 is a multirouter zeroconfiguration network useful in understanding the principles of the invention.

FIG. 5 depicts a zeroconf network with 3 ARM routers. Assume that all routers are stand-alone routers. Also assume that all routers assign LD-subnetids $a_1$, $a_2$ and $a_3$ to their interfaces (directly connected segments) 1, 2 and 3 respectively during initialization. Table VIII below shows the initial ARM table of routers R1 and R2. The ARM tables in Table VIII not only contain address mapping information, i.e., the LD-subnetid to ED-subnetid mapping, but also the routing information. That is, the routing table is a subset of the ARM table. In Table VIII, the first 2 fields (ED-subnetid and LD-subnetid) are ARM layer specific data and the remaining 4 fields (If, Dest, GW and Metric) constitute the IP routing table. In the rest of the paper, the ARM layer specific data and the IP routing table is separated by double lines in the ARM tables.

Now assume that, routers R1 and R2 are interconnected. That is, interface 1 of R1 gets connected to interface 1 of R2. Assuming that the routers are using RIPv2, they exchange RIP packets to advertise and learn the new routers. Table IX shows the RTEs contained in the RIPv2 packets that go from R1 to R2, and R2 to R1. Notice that there is no way for R2 to detect that the routes advertised by R1 refer to new segments. When the RIP packet from R1 is received, R2 assumes that the subnets $a_i.0, i=1,2,3$, specified in the RIP packet refer to the same subnets that R2 has assigned on interface "i", i=1,2,3. Because subnets $a_i.0$ are directly connected to R2, the subnets $a_i.0$ specified within the RIP packet are discarded due to higher cost. When R1 receives a RIP packet from R2 it conducts a similar calculation and cannot distinguish between its own subnet assignments $a_i.0$ and those specified within the RIP packet. There is no way for any of the routers to detect the new segments in the network and they both assume that the network has 3 segments. For correct operation of the network, we want a way for the routers to detect each segment in the network and assign locally unique subnet numbers.

TABLE VIII

ARM caption of table when R1 and R2 are stand-alone.

| ED-Subnetid | LD-Subnetid | If | Dest | GW | Metric |
|---|---|---|---|---|---|
| (a) ARM Table at R1 | | | | | |
| I | $a_1$ | 1 | $a_1.0$ | $a_1.R_{11}$ | 1 |
| I | $a_2$ | 2 | $a_2.0$ | $a_2.R_{12}$ | 1 |
| I | $a_3$ | 3 | $a_3.0$ | $a_3.R_{13}$ | 1 |
| (b) ARM Table at R2 | | | | | |
| I | $a_1$ | 1 | $a_1.0$ | $a_1.R_{21}$ | 1 |
| I | $a_2$ | 2 | $a_2.0$ | $a_2.R_{22}$ | 1 |
| I | $a_3$ | 3 | $a_3.0$ | $a_3.R_{23}$ | 1 |

In Table VIII "ED-Subnetid" is the externally-defined subnet number of the segment (route), "LD-Subnetid" is the locally-defined unique subnet number of the segment, "Dest" is the segment's subnet number from the router's perspective and has the same value as "LD-Subnetid", "GW" is the IP address of the router where the packets will be sent from interface "If" to reach the segment and "Metric" is the distance of the segment from the router in terms of number of hops.

TABLE IX

RIP packets exchanged between R1 and R2 of FIG. 5

| IP | Next Hop | Metric |
|---|---|---|
| (a) RIP packet: R1 → R2 | | |
| $a_1.0$ | $a_1.R_{11}$ | 1 |
| $a_2.0$ | $a_1.R_{11}$ | 1 |
| $a_3.0$ | $a_1.R_{11}$ | 1 |
| (b) RIP packet: R2 → R1 | | |
| $a_1.0$ | $a_1.R_{21}$ | 1 |
| $a_2.0$ | $a_1.R_{21}$ | 1 |
| $a_3.0$ | $a_1.R_{21}$ | 1 |

Extending RIP for ARM

The RIP protocol of the invention may be further extended to work in a zeroconf network consisting of ARM routers. We call the new protocol ARM Routing Information Protocol (ARP). The ARIP protocol extends the RIP packet structure (RTE to be precise) so that ARM routers can detect the addition of new segments to the network. In the following, we first describe the extensions that are needed and the reason behind them, and then describe the complete protocol.

New Segment Detection

Each RTE in a RIP packet specifies a subnet number, a netmask, the next hop router to reach the subnet and the hop count to reach the subnet. This information is sufficient as each subnet is unique in an administered network. In a zeroconf network, however, there could be more than one router that locally assigns the same subnet number to its directly connected segments as each router assigns subnet numbers independently. In order to detect the existence of new segments (routes) after the routers are interconnected, we propose the use of a unique interface identifier (UID) with each RTE. A UID uniquely identifies a segment connected to an interface of a router within the zeroconf network. When a router initializes, it must generate a UID for an interface and then algorithmically or randomly assign a locally unique subnet number. Thus, each subnet is associated with a UID that is unique within the zeroconf network.

The presently preferred embodiment uses a UID that is 12 bytes in length. The first byte is a unique MAC type of the interface (assigned by IANA). The remaining 11 bytes can be generated from the MAC address of the interface or randomly generated if the interface does not have a MAC address. For example, if the interface is Ethernet, the first byte is the IANA assigned MAC number for Ethernet and the last eleven bytes of the UID are the six bytes of Ethernet MAC address concatenated with five bytes of 0's. Since Ethernet addresses are globally unique, this generates a unique UID for the interface (and/or segment) within the zeroconf network. A UID can be generated similarly for other types of interfaces.

TABLE X

Routing tables when the routers are stand-alone, augmented with UIDs.

| UID | ED-Subnetid | LD-Subnetid | If | Dest | GW | Metric |
|---|---|---|---|---|---|---|
| (a) ARM Table of R1 with UID | | | | | | |
| $U_{11}$ | I | $a_1$ | 1 | $a_1.0$ | $a_1.R_{11}$ | 1 |
| $U_{12}$ | I | $a_2$ | 2 | $a_2.0$ | $a_2.R_{12}$ | 1 |
| $U_{13}$ | I | $a_3$ | 3 | $a_3.0$ | $a_3.R_{13}$ | 1 |
| (b) ARM Table of R2 with UID | | | | | | |
| $U_{21}$ | I | $a_1$ | 1 | $a_1.0$ | $a_1.R_{21}$ | 1 |
| $U_{22}$ | I | $a_2$ | 2 | $a_2.0$ | $a_2.R_{22}$ | 1 |
| $U_{23}$ | I | $a_3$ | 3 | $a_3.0$ | $a_3.R_{23}$ | 1 |

Tables X shows the ARM tables of R1 and R2 augmented with the UIDs. When the routers are interconnected, each advertised route is augmented with its UID. When the routers receive the ARIP packets from each other, they calculate new ARM tables augmented with the new routes they just learned. Table XI shows the new ARM tables at R1 and R2 after the connection. Because each route is now uniquely identified by a UID, both routers easily detect new segments. For each new segment, routers assign

TABLE XI

ARM Tables at R1 and R2 after the connection.

| UID | ED-Subnetid | LD-Subnetid | If | Dest | GW | Metric |
|---|---|---|---|---|---|---|
| (a) ARM Table of R1 with UID | | | | | | |
| $U_{11}$ | I | $a_1$ | 1 | $a_1.0$ | $a_1.R_{11}$ | 1 |
| $U_{12}$ | I | $a_2$ | 2 | $a_2.0$ | $a_2.R_{12}$ | 1 |
| $U_{13}$ | I | $a_3$ | 3 | $a_3.0$ | $a_3.R_{13}$ | 1 |
| $U_{21}$ | $a_1$ | $a_4$ | 1 | $a_4.0$ | $a_4.R_{21}$ | 2 |
| $U_{22}$ | $a_2$ | $a_5$ | 1 | $a_5.0$ | $a_4.R_{21}$ | 2 |
| $U_{23}$ | $a_3$ | $a_6$ | 1 | $a_6.0$ | $a_4.R_{21}$ | 2 |
| (b) ARM Table of R2 with UID | | | | | | |
| $U_{21}$ | I | $a_1$ | 1 | $a_1.0$ | $a_1.R_{11}$ | 1 |
| $U_{22}$ | I | $a_2$ | 2 | $a_2.0$ | $a_2.R_{12}$ | 1 |
| $U_{23}$ | I | $a_3$ | 3 | $a_3.0$ | $a_3.R_{13}$ | 1 |
| $U_{11}$ | $a_1$ | $a_4$ | 1 | $a_4.0$ | $a_4.R_{11}$ | 2 |
| $U_{12}$ | $a_2$ | $a_5$ | 1 | $a_5.0$ | $a_4.R_{11}$ | 2 |
| $U_{13}$ | $a_3$ | $a_6$ | 1 | $a_6.0$ | $a_4.R_{11}$ | 2 | a locally-unique subnet number and insert the route into the ARM table. For example, R1 assigns LD-subnetid $a_5.0$ for the segment connected to the interface 2 of R2. This means that from R1's perspective, the subnet number of the segment connected to the interface 2 of R2 is $a_5.0$, that it is 2 hops away and that any packet destined to $a_5.0$ subnet must be sent to R2.

R1's ARM table also notes that from R2's perspective the same segment's subnet number is $a_2.0$ as noted by the "ED-Subnetid" field. Notice that for R2's directly connected segments, the "ED-Subnetid" field in R1's ARM table keeps mappings that are local to R2. So, when a packet destined to a host on one of R2's directly connected segments is forwarded from R1 to R2, the destination IP address is mapped to R2's local mapping for the segment using the "ED-Subnetid" field in R1's ARM table. Again, this is similar to the manipulation of virtual circuit identifiers in connection oriented networks. In this case however, the translation is done not on individual connection basis but on a segment basis. Since the number of segments in the network is much less than the number of active connections, the ARM scheme is highly scalable.

ARIP Packet Format

Figures 6, 7:
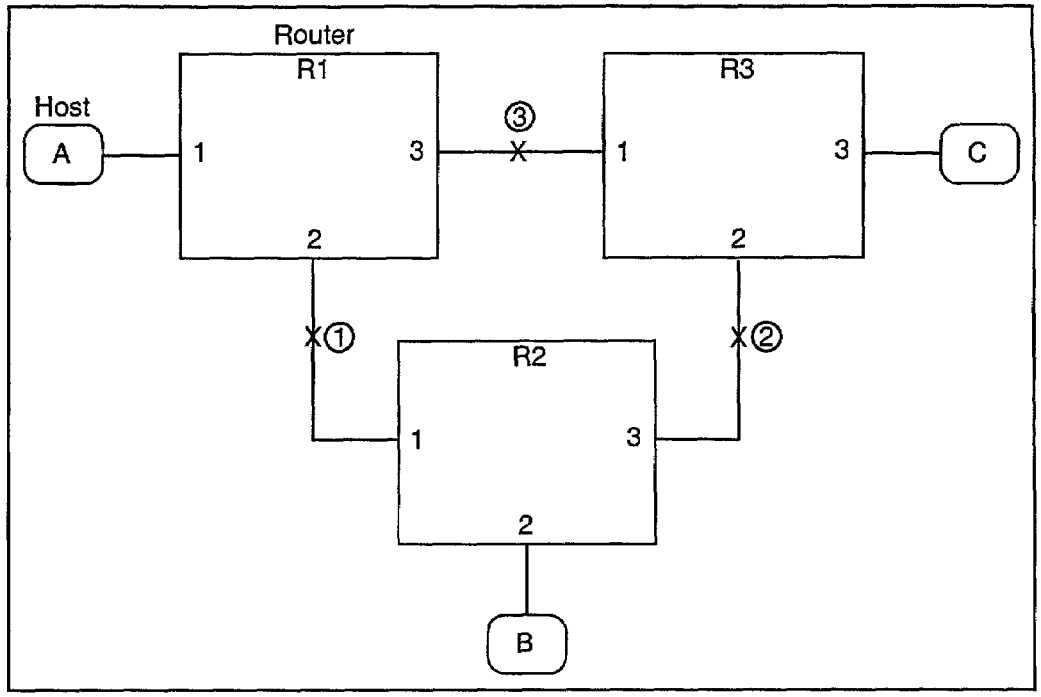
FIG. 6 is another multirouter zeroconfiguration network which forms a loop, and is useful in understanding the invention.
FIG. 7 is a packet flow diagram illustrating the translations that occur in an exemplary communication between hosts A and C.

ARIP uses a packet format similar to RIPv2 except that ARIP augments a RTE with additional fields used for uniquely identifying a segment. The packet formats are shown in FIG. 6. Comparison of ARIP RTE to RIPv2 RTE (FIGS. 6 and 4) shows that ARIP adds 12 more bytes to the RIP RTE. The Address Family Identifier and Route Tag fields have the same meaning as in RIP. Address Family Identifier is always AF-INET as in RIP and means that it is an Internet address. Interface Type augmented with the Unique Interface Identifier make up the 12 byte UID for the RTE. The UID identifies the interface of the router that owns this RTE. The rest of the fields in a RTE has the same meaning as in RIPv2. IP Address is the IP address of the subnet for the segment connected to the interface of the router, Netmask is the network mask assigned by the router and Next Hop is the IP address of the router where the packets must be sent to reach this route. Each RTE in an ARIP packet is 32 bytes. Because an ARIP packet can be at most 512 bytes, an ARIP packet can contain at most fifteen RTEs. If the routing table to a router contains more routes, additional packets are sent.

Unique Previous Hop Detection

Assume that all the routers in FIG. 5 are interconnected as shown to form a network consisting of 3 routers. Consider a packet that arrives at interface 1 of R1. Assume that the subnet number of the source IP address of the incoming packet is $a_2.0$. When R1 receives the packet, the ARM layer needs to remap the source IP of the packet before delivering it to the IP layer. Specifically, the ARM layer at R1 needs to identify the segment where the packet is coming from. If the ARM table only keeps the UID and the external to local mapping as the ARM table in Table Xl shows, R1 cannot determine the new source address for the packet because it cannot uniquely identify the segment that the packet is coming from. This is due to the fact that both R2 and R3 are locally using $a_2.0$ for the segments connected to their interface 2. So, the packet is coming either from a host connected to interface 2 or R3 (host A) or from a host connected to interface 2 of R2 (host C). R1 cannot determine where the packet is coming from without additional information. Notice that the packet does not contain the UID of the segment from where it originated but it contains the MAC address of the router which forwarded it. So, by keeping the MAC address of the router which advertises a route, R1 can identify the segment and the new source IP of the packet.

TABLE XII

ARM Table of R1 of FIG. 5 extended with the MAC Address of the router from which the route was learned.

| UID | MAC | ED-Subnetid | LD-Subnetid | If | Dest | GW | Metric |
|---|---|---|---|---|---|---|---|
| $U_{11}$ | * | I | $a_1$ | 1 | $a_1.0$ | $a_1.R_{11}$ | 1 |
| $U_{12}$ | * | I | $a_2$ | 2 | $a_2.0$ | $a_2.R_{12}$ | 1 |
| $U_{13}$ | * | I | $a_3$ | 3 | $a_3.0$ | $a_3.R_{13}$ | 1 |
| $U_{21}$ | $MAC_{21}$ | $a_1$ | $a_4$ | 1 | $a_4.0$ | $a_4.R_{21}$ | 2 |
| $U_{22}$ | $MAC_{21}$ | $a_2$ | $a_5$ | 1 | $a_5.0$ | $a_4.R_{21}$ | 2 |
| $U_{23}$ | $MAC_{21}$ | $a_3$ | $a_6$ | 1 | $a_6.0$ | $a_4.R_{21}$ | 2 |
| $U_{31}$ | $MAC_{31}$ | $a_1$ | $a_7$ | 1 | $a_7.0$ | $a_7.R_{31}$ | 2 |
| $U_{32}$ | $MAC_{31}$ | $a_2$ | $a_8$ | 1 | $a_8.0$ | $a_7.R_{31}$ | 2 |
| $U_{33}$ | $MAC_{31}$ | $a_3$ | $a_9$ | 1 | $a_9.0$ | $a_7.R_{31}$ | 2 |

Table XII shows the ARM table of R1 augmented with the MAC address of the router from which the route was learned. With the extra MAC field, R1 can easily distinguish the segment where the packet is coming from and perform the necessary translation.

ARIP Packet Processing

The algorithm in Table XIII shows how an ARIP packet is processed. Each RTE in the packet is processed in succession. First, the router checks if the advertised route is already known. If the routes is new, then it simply creates a local mapping for the new route (segment) and inserts it into the ARM table. If the route was already known, it checks if the advertised route is a shorter path to the segment. If the advertised route is shorter, the ARM table entry is updated with the new information. In any case, the expiration time of the entry in the ARM table is updated because a route that does not exist anymore must age out.

TABLE XIII

```
/* Router R receives an ARIP packet at Interface If
   from R_X having Interface MAC Address MAC_X
   ed-subnetid refers to "externally-defined subnetid" and
   Id-subnetid refers to "locally-defined subnetid" */
Process-ARIP-Packet (ARIP packet)
   for each RTE (UID, ed-subnetid, metric) in ARIP packet do
      if UID is not in the ARM table then
         Id-subnetid = A unique locally-defined subnetid
            assigned to UID (the segment)
         insert (UID, MAC_X, ed-subnetid, Id-subnetid, If, metric)
            into the ARM table.
      endif else
         mine = entry in my current ARM table
            where mine.UID = = UID
         if RTE metric ◁ mine.metric then
            mine.ed-subnetid = ed-subnetid
            mine.metric = metric + 1
            mine.MAC = MAC_X
            mine.if = If
         endif
         Update mine.expiration-time
      end-else
```

An Example ARM Table Updates

In this section we show how the ARM Tables are updated as new routers are added to the network. We use the network of FIG. 7 as an example network to elaborate on this. Assume that a router $R_i$ assigns locally unique subnet number $a_{ij}$ to its interface "j" when the interface is discovered. For example, in FIG. 7 R2 assigns $a_{21}$ to the segment connected to its interface 1.

In FIG. 7, the network consists of 3 ARM routers (R1, R2, and R3) and 3 hosts. Assume that initially 3 separate zeroconf networks connected by single routers R1, R2, and R3 were in stable state. The marks 1, 2, and 3 in circles show the order of connections of the routers. So, first R1 and R2 are connected on the shared segment connected to interface 2 of R1 and interface 1 of R2. Then R2 and R3 are connected.

Lastly, R1 and R3 are connected to form the loop in the network. Below we describe how the route advertisement and the ARM Table update work as routers get interconnected.

Initial Configuration: Before the routers are connected together, each routers are connected together, each routers has the ARM Table shown in Table XIV.

R1 and R2 are connected: Using the ARIP protocol R1 advertises routed $[(U_{11}, I_{11}), (U_{12}, I_{12}, (U_{13}, I_{13})]$ because these are the only routes reachable through R1. Similarly, R2 advertises $[(U_{21}, I_{21}), (U_{22}, I_{22}), (U_{23}, I_{23})]$. When R1 receives the ARIP packet, it sees that all the routes advertised by R2 are new. So, it inserts them into its ARM table and assigns new local mappings for them. R2 proceeds similarly, Table XV

TABLE XIV

Initial ARM tables at routers R1, R2 and R3.

| UID | MAC | ED-Subnetid | LD-Subnetid | If | Dest | GW | Metric |
|---|---|---|---|---|---|---|---|
| (a) Initial ARM table at R1 | | | | | | | |
| $U_{11}$ | * | I | $a_{11}$ | 1 | $a_{11}.0$ | $a_{11}.R_{11}$ | 1 |
| $U_{12}$ | * | I | $a_{12}$ | 2 | $a_{12}.0$ | $a_{12}.R_{12}$ | 1 |
| $U_{13}$ | * | I | $a_{13}$ | 3 | $a_{13}.0$ | $a_{13}.R_{13}$ | 1 |
| (b) Initial ARM Table at R2 | | | | | | | |
| $U_{21}$ | * | I | $a_{21}$ | 1 | $a_{21}.0$ | $a_{21}.R_{21}$ | 1 |
| $U_{22}$ | * | I | $a_{22}$ | 2 | $a_{22}.0$ | $a_{22}.R_{22}$ | 1 |
| $U_{23}$ | * | I | $a_{23}$ | 3 | $a_{23}.0$ | $a_{23}.R_{23}$ | 1 |
| (c) Initial ARM Table at R3 | | | | | | | |
| $U_{31}$ | * | I | $a_{31}$ | 1 | $a_{31}.0$ | $a_{31}.R_{31}$ | 1 |
| $U_{32}$ | * | I | $a_{32}$ | 2 | $a_{32}.0$ | $a_{32}.R_{32}$ | 1 |
| $U_{33}$ | * | I | $a_{33}$ | 3 | $a_{33}.0$ | $a_{33}.R_{33}$ | 1 | shows the ARM Tables at R1 and R2 after the first ARIP message are exchanged and processed. As seen from the new ARM tables, R1 assigns LD-subnetids $a_{14}$, $a_{15}$ and $a_{16}$ and R2 assigns $a_{24}$, $a_{25}$ and $a_{26}$ for the newly advertised segments.

TABLE XV

ARM Tables at R1 and R2 after the first ARIP message exchange.

| UID | MAC | ED-Subnetid | LD-Subnetid | If | Dest | GW | Metric |
|---|---|---|---|---|---|---|---|
| (a) ARM Table at R1 after the first ARIP message exchange. | | | | | | | |
| $U_{11}$ | * | I | $a_{11}$ | 1 | $a_{11}.0$ | $a_{11}.R_{11}$ | 1 |
| $U_{12}$ | * | I | $a_{12}$ | 2 | $a_{12}.0$ | $a_{12}.R_{12}$ | 1 |
| $U_{13}$ | * | I | $a_{13}$ | 3 | $a_{13}.0$ | $a_{13}.R_{13}$ | 1 |
| $U_{21}$ | $MAC_{21}$ | $a_{21}$ | $a_{14}$ | 2 | $a_{14}.0$ | $a_{14}.R_{21}$ | 2 |
| $U_{22}$ | $MAC_{22}$ | $a_{22}$ | $a_{15}$ | 2 | $a_{15}.0$ | $a_{14}.R_{21}$ | 2 |
| $U_{23}$ | $MAC_{23}$ | $a_{23}$ | $a_{16}$ | 2 | $a_{16}.0$ | $a_{14}.R_{21}$ | 2 |

TABLE XV-continued

ARM Tables at R1 and R2 after the first ARIP message exchange.

| UID | MAC | ED-Subnetid | LD-Subnetid | If | Dest | GW | Metric |
|---|---|---|---|---|---|---|---|
| (b) ARM Table at R2 after the first ARIP message exchange. | | | | | | | |
| $U_{21}$ | * | I | $a_{21}$ | 1 | $a_{21}.0$ | $a_{21}.R_{21}$ | 1 |
| $U_{22}$ | * | I | $a_{22}$ | 2 | $a_{22}.0$ | $a_{22}.R_{22}$ | 1 |
| $U_{23}$ | * | I | $a_{23}$ | 3 | $a_{23}.0$ | $a_{23}.R_{23}$ | 1 |
| $U_{11}$ | $MAC_{12}$ | $a_{11}$ | $a_{24}$ | 1 | $a_{25}.0$ | $a_{25}.R_{12}$ | 2 |
| $U_{12}$ | $MAC_{12}$ | $a_{12}$ | $a_{25}$ | 1 | $a_{26}.0$ | $a_{25}.R_{12}$ | 2 |
| $U_{13}$ | $MAC_{12}$ | $a_{13}$ | $a_{26}$ | 1 | $a_{27}.0$ | $a_{25}.R_{12}$ | 2 |

Clearly, after the first ARIP message is exchanged between R1 and R2, the new zeroconf network stabilizes. Both R1 and R2 update their ARM tables properly and learn the complete topology of the network.

R3 is connected to R2: When R3 is connected to R2, the routers auto-configure in a similar manner based on ARIP messages. Table XVI shows the ARM tables at R2 and R3 after the first ARIP packet exchange between them. At this point R2 and R3 know the complete topology of the network. Again, both routers learn the existence of new segments (routes) in the network and assign LD-subnetids for them.

It takes one more ARIP message exchange for R1 to learn the complete topology of the network. When

TABLE XVI

ARM Tables at R2 and R3 after R3 is connected to R2

| UID | MAC | ED-Subnetid | LD-Subnetid | If | Dest | GW | Metric |
|---|---|---|---|---|---|---|---|
| (a) ARM Table at R2 after R3 is attached to R2. | | | | | | | |
| $U_{21}$ | * | I | $a_{21}$ | 1 | $a_{21}.0$ | $a_{21}.R_{21}$ | 1 |
| $U_{22}$ | * | I | $a_{22}$ | 2 | $a_{22}.0$ | $a_{22}.R_{22}$ | 1 |
| $U_{23}$ | * | I | $a_{23}$ | 3 | $a_{23}.0$ | $a_{23}.R_{23}$ | 1 |
| $U_{11}$ | $MAC_{12}$ | $a_{11}$ | $a_{24}$ | 1 | $a_{24}.0$ | $a_{25}.R_{12}$ | 2 |
| $U_{12}$ | $MAC_{12}$ | $a_{12}$ | $a_{25}$ | 1 | $a_{25}.0$ | $a_{25}.R_{12}$ | 2 |
| $U_{13}$ | $MAC_{12}$ | $a_{13}$ | $a_{26}$ | 1 | $a_{26}.0$ | $a_{25}.R_{12}$ | 2 |
| $U_{31}$ | $MAC_{32}$ | $a_{31}$ | $a_{27}$ | 3 | $a_{27}.0$ | $a_{28}.R_{32}$ | 2 |
| $U_{32}$ | $MAC_{32}$ | $a_{32}$ | $a_{28}$ | 3 | $a_{28}.0$ | $a_{28}.R_{32}$ | 2 |
| $U_{33}$ | $MAC_{32}$ | $a_{33}$ | $a_{29}$ | 3 | $a_{29}.0$ | $a_{28}.R_{32}$ | 2 |
| (b) ARM Table at R3 after R3 is attached to R2. | | | | | | | |
| $U_{31}$ | * | I | $a_{31}$ | 1 | $a_{31}.0$ | $a_{31}.R_{31}$ | 1 |
| $U_{32}$ | * | I | $a_{32}$ | 2 | $a_{32}.0$ | $a_{32}.R_{32}$ | 1 |
| $U_{33}$ | * | I | $a_{33}$ | 3 | $a_{33}.0$ | $a_{33}.R_{33}$ | 1 |
| $U_{21}$ | $MAC_{23}$ | $a_{21}$ | $a_{34}$ | 2 | $a_{34}.0$ | $a_{36}.R_{23}$ | 2 |
| $U_{22}$ | $MAC_{23}$ | $a_{22}$ | $a_{35}$ | 2 | $a_{35}.0$ | $a_{36}.R_{23}$ | 2 |
| $U_{23}$ | $MAC_{23}$ | $a_{23}$ | $a_{36}$ | 2 | $a_{36}.0$ | $a_{36}.R_{23}$ | 2 |
| $U_{11}$ | $MAC_{23}$ | $a_{24}$ | $a_{37}$ | 2 | $a_{37}.0$ | $a_{36}.R_{23}$ | 3 |
| $U_{12}$ | $MAC_{23}$ | $a_{25}$ | $a_{38}$ | 2 | $a_{38}.0$ | $a_{36}.R_{23}$ | 3 |
| $U_{13}$ | $MAC_{23}$ | $a_{26}$ | $a_{39}$ | 2 | $a_{39}.0$ | $a_{36}.R_{23}$ | 3 |

Table XVI: ARM Tables at R2 and R3 after R3 is connected to R2 R2 sends its next ARIP message to R1, R1 sees that there are now new routes through R2 and update its ARM table. Table XVII shows the new ARM table at R1.

TABLE XVII

ARM Table at R1 after R2 and R3 is connected

| UID | MAC | ED-Subnetid | LD-Subnetid | If | Dest | GW | Metric |
|---|---|---|---|---|---|---|---|
| $U_{11}$ | * | I | $a_{11}$ | 1 | $a_{11}.0$ | $a_{11}.R_{11}$ | 1 |
| $U_{12}$ | * | I | $a_{12}$ | 2 | $a_{12}.0$ | $a_{12}.R_{12}$ | 1 |
| $U_{13}$ | * | I | $a_{13}$ | 3 | $a_{13}.0$ | $a_{13}.R_{13}$ | 1 |
| $U_{21}$ | $MAC_{21}$ | $a_{21}$ | $a_{14}$ | 2 | $a_{14}.0$ | $a_{14}.R_{21}$ | 2 |
| $U_{22}$ | $MAC_{21}$ | $a_{22}$ | $a_{15}$ | 2 | $a_{15}.0$ | $a_{14}.R_{21}$ | 2 |
| $U_{23}$ | $MAC_{21}$ | $a_{23}$ | $a_{16}$ | 2 | $a_{16}.0$ | $a_{14}.R_{21}$ | 2 |
| $U_{31}$ | $MAC_{21}$ | $a_{27}$ | $a_{17}$ | 2 | $a_{17}.0$ | $a_{14}.R_{21}$ | 3 |
| $U_{32}$ | $MAC_{21}$ | $a_{28}$ | $a_{18}$ | 2 | $a_{18}.0$ | $a_{14}.R_{21}$ | 3 |
| $U_{33}$ | $MAC_{21}$ | $a_{29}$ | $a_{19}$ | 2 | $a_{19}.0$ | $a_{14}.R_{21}$ | 3 |

R3 is connected to R1:

Finally, R3 is connected to R1 to form the loop in the network. Notice that R1 can now reach the segments connected to R3 by directly sending the packets to R3. Similarly, R3 can reach the segments connected ro R1 by directly sending the packets to R1. So, when R1 gets the next ARIP packet from R3, it updates its ARM table acordingly. Note that R1 is not learning the existence of new segments but it learns shorter paths to the segments connected to R3. For example, R1 can now reach the segment connected to interface 3 of R3 in 2 hops by sending the packets to R3 on its interface 3. So, the ARM table is updated accordingly for all the other segments and the final ARM tables at R1 and R3 are shown in Table XVIII.

TABLE XVIII

The final ARM tables at R1 and R3 after R1 and R3 are connected.

| UID | MAC | ED-Subnetid | LD-Subnetid | If | Dest | GW | Metric |
|---|---|---|---|---|---|---|---|
| (a) The final ARM table at R1 after R3 is connected to R1. | | | | | | | |
| $U_{11}$ | * | I | $a_{11}$ | 1 | $a_{11}.0$ | $a_{11}.R_{11}$ | 1 |
| $U_{12}$ | * | I | $a_{12}$ | 2 | $a_{12}.0$ | $a_{12}.R_{12}$ | 1 |
| $U_{13}$ | * | I | $a_{13}$ | 3 | $a_{13}.0$ | $a_{13}.R_{13}$ | 1 |
| $U_{21}$ | $MAC_{21}$ | $a_{21}$ | $a_{14}$ | 2 | $a_{14}.0$ | $a_{14}.R_{21}$ | 2 |
| $U_{22}$ | $MAC_{21}$ | $a_{22}$ | $a_{15}$ | 2 | $a_{15}.0$ | $a_{14}.R_{21}$ | 2 |
| $U_{23}$ | $MAC_{21}$ | $a_{23}$ | $a_{16}$ | 2 | $a_{16}.0$ | $a_{14}.R_{21}$ | 2 |
| $U_{31}$ | $MAC_{31}$ | $a_{31}$ | $a_{17}$ | 3 | $a_{17}.0$ | $a_{17}.R_{31}$ | 2 |
| $U_{32}$ | $MAC_{31}$ | $a_{32}$ | $a_{18}$ | 3 | $a_{18}.0$ | $a_{17}.R_{31}$ | 2 |
| $U_{33}$ | $MAC_{31}$ | $a_{33}$ | $a_{19}$ | 3 | $a_{19}.0$ | $a_{17}.R_{31}$ | 2 |
| (b) The final ARM table at R3 after R3 is connected to R1. | | | | | | | |
| $U_{31}$ | * | I | $a_{31}$ | 1 | $a_{31}.0$ | $a_{31}.R_{31}$ | 1 |
| $U_{32}$ | * | I | $a_{32}$ | 2 | $a_{32}.0$ | $a_{32}.R_{32}$ | 1 |
| $U_{33}$ | * | I | $a_{33}$ | 3 | $a_{33}.0$ | $a_{33}.R_{33}$ | 1 |
| $U_{21}$ | $MAC_{23}$ | $a_{21}$ | $a_{34}$ | 2 | $a_{34}.0$ | $a_{36}.R_{23}$ | 2 |
| $U_{22}$ | $MAC_{23}$ | $a_{22}$ | $a_{35}$ | 2 | $a_{35}.0$ | $a_{36}.R_{23}$ | 2 |
| $U_{23}$ | $MAC_{23}$ | $a_{23}$ | $a_{36}$ | 2 | $a_{36}.0$ | $a_{36}.R_{23}$ | 2 |
| $U_{11}$ | $MAC_{13}$ | $a_{11}$ | $a_{37}$ | 1 | $a_{37}.0$ | $a_{39}.R_{13}$ | 2 |
| $U_{12}$ | $MAC_{13}$ | $a_{12}$ | $a_{38}$ | 1 | $a_{38}.0$ | $a_{39}.R_{13}$ | 2 |
| $U_{13}$ | $MAC_{13}$ | $a_{13}$ | $a_{39}$ | 1 | $a_{39}.0$ | $a_{39}.R_{13}$ | 2 |

An Example Packet Flow

In this section, we trace the flow of a packet in the network shown in FIG. 7 and show the translations that occur along the way. As an example, we show how host A and C communicate with each other.

Assume that host A and C run a simple ping-pong program where host A sends a packet to host C and the packet is echoed back to host A. From host A's perspective host C's address is $a_{19}.C$. We assume that when host A sends the packet, the third connection in the network is not done yet. That is, R1 doe not have a direct path to R3 but has to send the packet to R2 to reach host C. At this point, the ARM Table of R1 is as shown in Table XVII and the ARM Tables of R2 and R3 are shown in Table XVI. Table XIV shows the source and the destination IP address of a packet sent from host A to host C as the packet travels through the network.

TABLE XIV

The translations of the source and destination IP address of a packet travelling from host A to host C.

|  | DestIP | Comment |
|---|---|---|
| I.A | $a_{19}$.C | Pkt leaves host A |
| $a_{11}$.A | $a_{19}$.C | Pkt rcvd by R1 and given to IP layer |
| $a_{11}$.A | $a_{29}$.C | Right before the pkt is sent by R1 on intf 2 |
| $a_{24}$.A | $a_{29}$.C | Pkt rcvd by R2 and given to IP layer. |
| $a_{24}$.A | $a_{33}$.C | Right before the pkt sent by R2 on intf 3 |
| $a_{37}$.A | $a_{33}$.C | Pkt rcvd by R3 and given to IP layer |
| $a_{37}$.A | I.C | Right before the pkt sent by R3 on intf 3 |
| $a_{37}$.A | I.C | Pkt rcvd by C and given to the application |

When host C receives the packet, it sees that host A's address is $a_{37}$.A. Note that this address is from the perspective of router R3 which is the default router for host C. We now assume that right before host C sends the packet to host A, R1 and R3 are connected and there is a direct path from R3 to R1. So, the ARM tables at R1 and R3 are shown in Table XVIII. A packet from host C to host A goes through the translations detailed in Table XV. Notice that because of the new connection between R1 and R3, the packet now takes the shorter path and does not visit R2. Had the connection not been made, the packet would still have traveled over R2 to reach host A. Also note that if we connect a new router into the network, the routers R1, R2 and R3 simply learn the new segments introduced by the new router and create new local mappings for them. The existing external to local mappings do not change which means that the existing connection between host A and C does not break by the addition or removal of a router as long as there is a path from host A to C.

TABLE XV

Translation of the source and destination IP address of a packet travelling from host C to host A.

| SourceIP | DestIP | Comment |
|---|---|---|
| I.C | $a_{37}$.A | Pkt leaves host C |
| $a_{33}$.C | $a_{37}$.A | Pkt rcvd by R3 and given to IP layer |
| $a_{33}$.C | $a_{11}$.A | Right before the pkt sent by R3 on intf 1 |
| $a_{19}$.C | $a_{11}$.A | Pkt rcvd by R1 and given to IP layer. |
| $a_{19}$.C | I.A | Right before the pkt sent by R1 on intf 1 |
| $a_{19}$.C | I.A | Pkt rcvd by A and given to the application |

Address Translation in Multi-Router Networks

As noted above, address translation is performed at two points. The source IP address is changed when a packet is received by a router and the destination IP address is changed right before a packet is given to the link-layer for transmission. In multi-router networks, the translation function LD2ED( ) shown in Table VII remains the same but ED2LD( ) has a small modification. The system also used the MAC address of the router that forwarded the packet to determine the local IP corresponding to the external source IP address of the packet. So, the line that calculates int-SIP in ED2LD( ) function of Table VII should be changed so that it also uses the MAC address of the packet to calculate the internal SIP.

While the invention has been described in its presently preferred embodiments, it will be understood that certain modifications can be made in accordance with the teachings herein without departing from the spirit of the invention as set forth in the appended claims.

What is claimed is:

1. A method for automatically processing subnet conflicts in a network defined by plural routers, each having interfaces to which segments are connected to support networked communication, comprising:
   identifying all segments connected the interfaces of said routers by assigning a unique interface identifier (UID) value to each segment;
   defining a zero-configuration routing information protocol (ZRIP) data structure that includes a UID structure for storing a UID value;
   establishing a routing table associated with each of said routers, the routing tables being based on said ZRIP protocol and defining routing table entry (RTE) records for storing the subnet mappings of the associated router;
   further defining each of said RTE records to include said UID structure as a data field associated with each of said subnet mappings;
   employing each router to assign subnet mappings to each segment connected to its interfaces and to populate the RTE records of its routing table with said subnet mappings in association with the UID values of each connected segment;
   exchanging RTE records between said routers and employing each router to compare RTE records received during said exchange with the RTE records in its routing table to detect if two or more subnet mappings are the same, whereupon a subnet conflict is declared.

2. The method of claim 1 further comprising providing notification when a subnet conflict is declared by exchanging RTE records between routers.

3. The method of claim 1 further comprising providing notification when a subnet conflict is declared by:
   defining said ZRIP data structure to include a status structure designate whether an RTE record represents a conflict notification; and
   transmitting an RTE record between one of said routers and another of said routers, with said status structure set to indicate the transmitted RTE record represents a conflict notification.

4. The method of claim 1 wherein a router detecting a subnet conflict automatically assigns a new subnet mapping to the conflicting subnet.

5. The method of claim 1 further comprising defining said ZRIP data structure to include a sequence structure for maintaining a running record of order in which subnet conflicts are processed.

6. The method of claim 1 further comprising:
   defining said ZRIP data structure to include a sequence structure that maintains a record of the order in which subnet conflicts are processed; and
   using said routers to automatically revise subnet mappings and advertise upon detection of a conflict, using said sequence structure to eliminate ambiguity between revised subnet mappings advertised at a first time and revised subnet mappings advertised at a later time.

7. The method of claim 1 wherein said segments are implemented using components that each have an assigned data link layer address and wherein UID value is assigned based on said standardized data link layer address.

8. The method of claim 7 wherein said data link layer address is a standardized media access control (MAC) address.

9. The method of claim 1 further comprising:
including a network address translation (NAT) table associated with each of said routers and updating said NAT table automatically in response to said exchanging of RTE records.

10. A method for identifying segments on a network without administrative intervention, the method comprising the steps of:
using a first router to identify a first network segment;
advertising the identification of the first segment to a second router;
detecting an address collision at the second router, wherein a second segment has identical identification as the first segment;
using the second router to inform the first router of the address collision;
using the first router to change the address of the first segment;
wherein the first and second segments are uniquely identified.

11. The method of claim 10, wherein the step of using the first router to identify the first network segment includes the step of creating a routing table entry corresponding to the first segment.

12. The method of claim 11, wherein the step of advertising the identification of the first segment includes the step of sending an information packet including the routing table entry.

13. The method of claim 12, wherein the step of informing the first router of the address collision includes sending an information packet including a routing table entry corresponding to the first segment.

14. The method of claim 12, wherein the step of using the second router to inform the first router of the address collision includes modifying the state of a status field in the routing table entry corresponding to the first segment.

15. The method of claim 10, further including the step of changing the identification of the second segment.

16. The method of claim 15, wherein the steps of changing the identification of the first and second segments includes the step of modifying a sequence number such that the routers can distinguish between current and previous segment identifications.

17. A method of exchanging information between routers on a computer network, the method comprising the steps of:
uniquely identifying each segment coupled to a first router in a first sub-network and storing this identification information in a first routing table;
uniquely identifying each segment coupled to a second router in a second sub-network and storing this identification information in a second routing table;
connecting the first sub-network to the second sub-network;
advertising the routes of the first router to the second router, wherein a route of the first router includes information on the path information must travel from the second router to get to a point on a segment coupled to the first router, and wherein these routes are communicated using routing table entries;
augmenting the second routing table with the routing table entries advertised by the first router;
detecting an address collision, wherein an address collision takes place if a first point on a first segment coupled to the first router has an identical address as a second point on a second segment coupled to the second router;
sending a notification from the second router to the first router including the address collision information; and
changing the identification of the first segment on the first router, wherein the new identification is unique throughout the entire network.

18. A method of identifying a point on a network such that requires no user configuration, the method comprising the steps of:
randomly selecting a network address for the point;
broadcasting that address to a second point on the network;
comparing the address of the second point to the address of the first point;
broadcasting the results of the comparison to the first node; and
if the address of the first point and the address of the second point are identical, randomly selecting a new network address for the first point.

19. The method of claim 18, further comprising the steps of:
broadcasting the address of the first point to a first router, wherein the router divides the network into segments such that the first point is on a first segment and the second point is on a second segment;
relaying the address of the first point from the router to the second point;
broadcasting the results of the comparison to the first router; and
relaying the results of the comparison from the first router to the first point.

20. The method of claim 19, wherein the step of broadcasting the results of the comparison from the first router to the first point includes comparing the address of the first point to reference information in the router.

21. The method of claim 19, further comprising the steps of:
broadcasting the address of the first point from the first router to a second router;
broadcasting the address of the first point from the second router to the second point;
broadcasting the results of the comparison from the second point to the second router; and
broadcasting the results of the comparison from second router to the first router.

22. The method of claim 21, wherein the steps of broadcasting the results of the comparison from the second router to the first router and broadcasting the results of the comparison from the first router to the first point include comparing the address of the first point to reference information in the router.

23. The method of claim 22, further comprising the steps of:
broadcasting the address of the first point to a plurality of other points; and
comparing the address of the first point to each of the plurality of points.

24. The method of claim 23, further comprising the steps of:
broadcasting the address of the first point from the first router to a plurality of routers;
broadcasting the address of the first point from each of the plurality of routers to a plurality of points; and
comparing the address of the first point to the address of each of the plurality of points.

25. The method of claim 18, wherein the first point and the second point are hosts.

26. The method of claim 18, wherein the first point and the second point are routers.

27. The method of claim 19, wherein the router uniquely identifies each segment.

28. An apparatus for communicating computer information, the apparatus comprising:
   a computer network;
   a first network node coupled to the computer network, the first node comprising an address selector for randomly selecting a network address, a network broadcaster for broadcasting that address to another network node, and a network receiver for receiving replies from another network node;
   a second network node coupled to the computer network having a unique network address, the second node comprising a network listener for receiving the network address from the first node, an address comparator for comparing the address of the first node to the address of the second node, and a network broadcaster for sending the comparator results to the network listener of the first node.

29. The apparatus of claim 28, wherein the network further comprises:
   a first sub-network, wherein the first node is coupled to the first sub-network;
   a second sub-network, wherein the second node is coupled to the second subnetwork; and
   a router, the router comprising an address selector for randomly selecting a network address, a network broadcaster, and a network listener.

* * * * *

UNITED STATES PATENT AND TRADEMARK OFFICE
CERTIFICATE OF CORRECTION

PATENT NO. : 7,002,924 B2  Page 1 of 1
APPLICATION NO. : 09/776586
DATED : February 21, 2006
INVENTOR(S) : David A. Braun et al.

It is certified that error appears in the above-identified patent and that said Letters Patent is hereby corrected as shown below:

Col. 20, Line 11, Claim 1:

After "connected", insert --to--

Signed and Sealed this

Twenty-ninth Day of January, 2008

JON W. DUDAS
*Director of the United States Patent and Trademark Office*